(12) United States Patent
Tucker et al.

(10) Patent No.: US 10,996,492 B2
(45) Date of Patent: May 4, 2021

(54) COLORED CONTACT LENS BASED ON AMORPHOUS IMAGES

(71) Applicant: Novartis AG, Basel (CH)

(72) Inventors: Robert Carey Tucker, Suwanee, GA (US); Laura Ashley Creech, Atlanta, GA (US)

(73) Assignee: Alcon Inc., Fribourg (CH)

( * ) Notice: Subject to any disclaimer, the term of this patent is extended or adjusted under 35 U.S.C. 154(b) by 666 days.

(21) Appl. No.: 15/437,653

(22) Filed: Feb. 21, 2017

(65) Prior Publication Data

US 2017/0248803 A1 Aug. 31, 2017

Related U.S. Application Data

(62) Division of application No. 12/887,094, filed on Sep. 21, 2010, now abandoned.

(60) Provisional application No. 61/245,044, filed on Sep. 23, 2009.

(51) Int. Cl.
    *B29D 11/00*     (2006.01)
    *B29K 105/00*    (2006.01)
    *G02C 7/04*      (2006.01)

(52) U.S. Cl.
    CPC ........ *G02C 7/046* (2013.01); *B29D 11/00134* (2013.01); *B29D 11/00961* (2013.01); *B29K 2105/0061* (2013.01); *B29K 2995/002* (2013.01)

(58) Field of Classification Search
    None
    See application file for complete search history.

(56) References Cited

U.S. PATENT DOCUMENTS

| | | | |
|---|---|---|---|
| 7,255,438 B2 * | 8/2007 | Atkins | B29D 11/00865 351/159.24 |
| 8,399,607 B2 * | 3/2013 | April, Jr. | B29C 71/02 264/234 |
| 2006/0181676 A1 * | 8/2006 | Tucker | G02C 7/046 351/159.24 |
| 2008/0062381 A1 * | 3/2008 | Doshi | B29D 11/00028 351/159.69 |

OTHER PUBLICATIONS

Adobe Photoshop CS3 User Guide—PS; San Jose, CA Adobe System Inc. (Year: 2007).*

* cited by examiner

*Primary Examiner* — Lisa L Herring
(74) *Attorney, Agent, or Firm* — Sheng-Hsin Hu (57) ABSTRACT

A method of manufacturing a colored contact lens including the steps of providing a transparent contact lens having a pupil section and an iris section, the iris section surrounding the pupil section and applying a colorant to the surface of the contact lens. The colorant is applied to the contact lens as an amorphous pattern and covers an effective amount of the iris section of the same. The amorphous pattern provides a lens capable of changing the apparent color of the iris of a person wearing the lens while imparting a very natural appearance.

4 Claims, 12 Drawing Sheets

COLORED CONTACT LENS BASED ON AMORPHOUS IMAGES

This application is a division of U.S. patent application Ser. No. 12/887,094, filed Sep. 21, 2010, which claims the benefits under 35 USC § 119 (e) of U.S. provisional application No. 61/245,044 filed Sep. 23, 2009, incorporated by reference in its entirety.

TECHNICAL FIELD

This application claims the benefit under 35 U.S.C. § 119 (e) of U.S. provisional application Ser. No. 61/245,044 filed on Sep. 23, 2009, herein incorporated by reference in its entirety.

The present invention relates generally to the field of colored contact lenses, and more particularly, to patterns for use on colored contact lenses that impart a very natural appearance to the lenses.

BACKGROUND OF THE INVENTION

Early attempts to modify or enhance the color of one's eyes utilized colored contact lenses with a simple solidly colored area that covered the iris portion of the eye. However, contact lenses with this type of opaque coloring imparted a very unnatural appearance. Other types of colored contact lenses were developed, such as Wichterle, U.S. Pat. No. 3,679,504, which discloses an opaque lens having an iris of more than a single color artistically drawn or photographically reproduced. However, such lenses did not look natural and as such never achieved commercial success. Other attempts to produce an opaque lens with a natural appearance are disclosed in. U.S. Pat. No. 3,536,386, (Spivak); U.S. Pat. No. 3,712,718 (LeGrand), U.S. Pat. No. 4,460,523 (Neefe), U.S. Pat. No. 4,719,657 (Bawa), U.S. Pat. No. 4,744,647 (Meshel et al.), U.S. Pat. No. 4,634,449 (Jenkins); European Patent Publication No. 0 309 154 (Allergan) and U.K Patent Application No. 2 202 540 A (IGEL).

Commercial success was achieved by the colored contact lens described in Knapp (in U.S. Pat. No. 4,582,402) which discloses a contact lens having, in its preferred embodiment, colored, opaque dots. The Knapp lens provides a natural appearance with a lens that is simple and inexpensive to produce, using a simple one-color printed dot pattern. Although the intermittent pattern of dots does not fully cover the iris, it provides a sufficient density of dots that a masking effect gives the appearance of a continuous color when viewed by an ordinary observer. Knapp also discloses that the printing step may be repeated one or more-times using different patterns in different colors, since upon close examination the iris is found to contain more than one color. The printed pattern need not be absolutely uniform, allowing for enhancement of the fine structure of the iris. The one-color Knapp lenses currently achieving commercial success have their dots arranged in an irregular pattern to enhance the structure of the iris. However, neither the Knapp commercial lenses, nor the Knapp patent disclose or suggest how one would arrange a pattern of dots having more than one color to achieve a more natural appearance.

Various efforts have been made to improve on the Knapp lens. U.S. Pat. No. 5,414,477 to Jahnke discloses the application of the intermittent ink pattern in two or more portions of distinct shades of colorant to provide a more natural appearance.

Other attempts to create a more natural appearing lens include U.S. Pat. No. 5,120,121 to Rawlings, which discloses a cluster of interconnecting lines radiating from the periphery of the pupil portion to the periphery of the iris portion. Further, European Patent No. 0 472 496 A2 shows a contact lens having a pattern of lines that attempts to replicate the lines found in the iris.

Figure 1A:
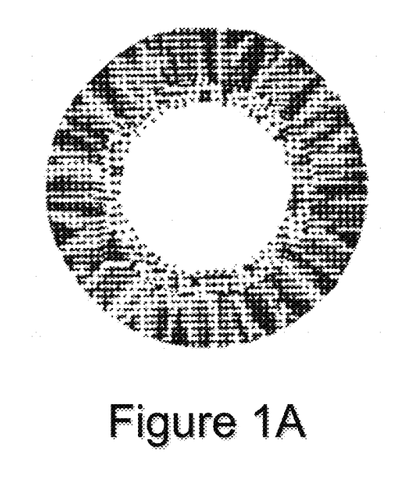
FIGS. 1*a*-1*c* illustrate known colored contact lens patterns.
Figure 1B:
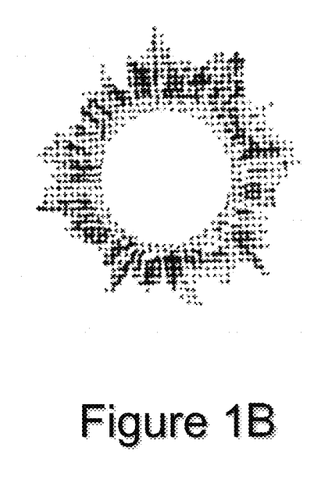
Figure 1C:
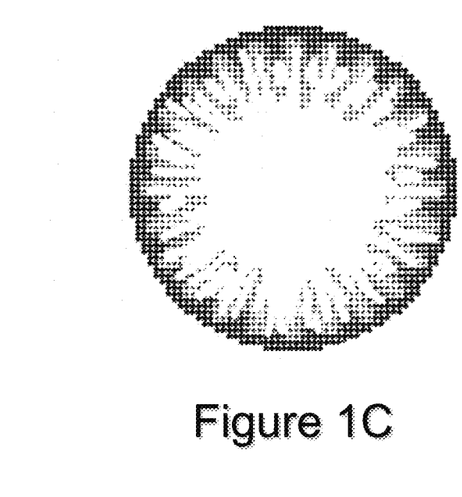
Figure 2:
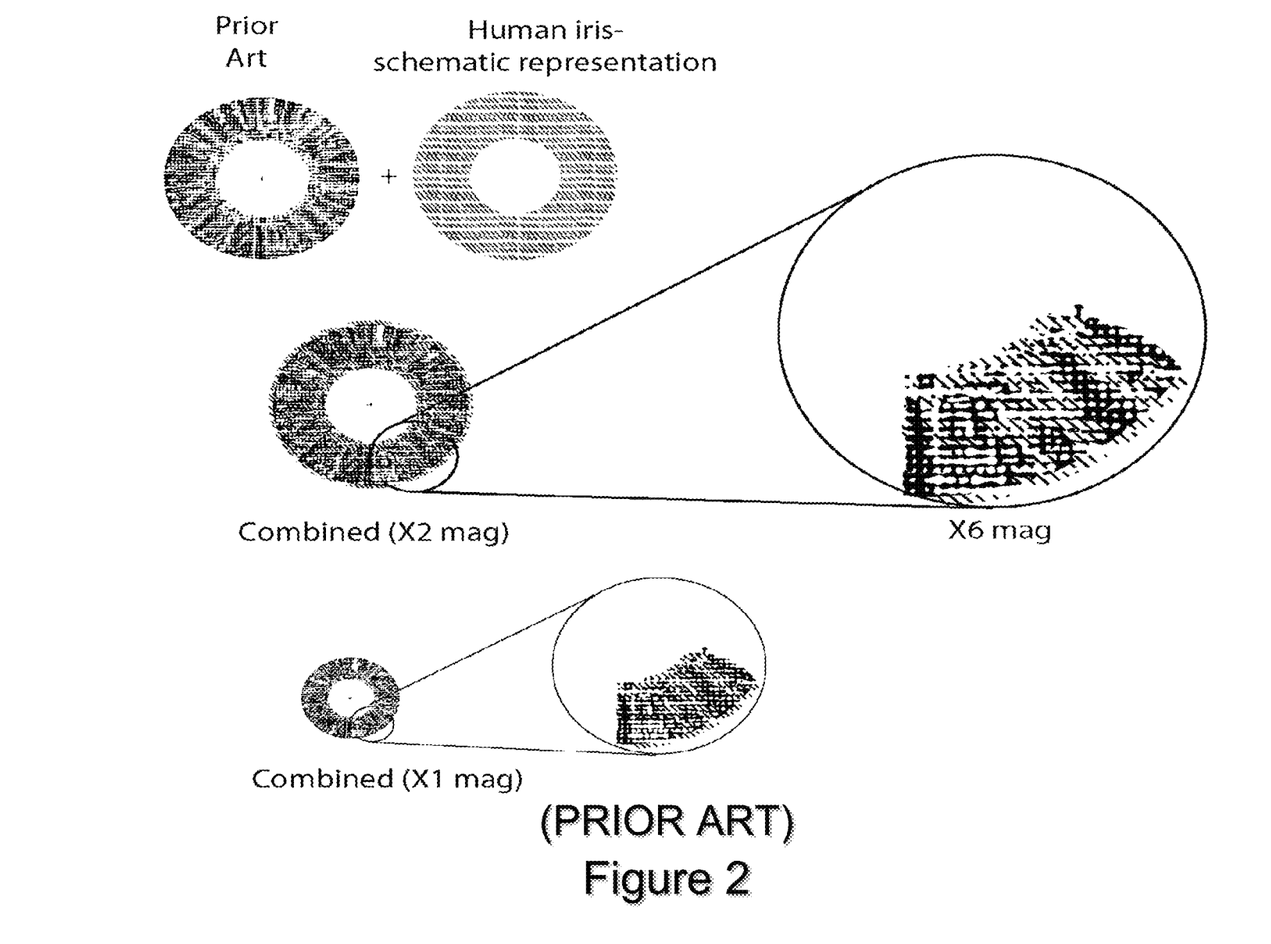
FIG. 2 depicts a known colored contact lens pattern combined with a schematic representation of a human iris and an enlarged view of the same.

More recent attempts to create even more natural looking lens include U.S. Pat. No. 7,438,412 to Ocampo, which discloses the use of three or more colored patterns that are printed in sequence on a contact lens (see FIGS. 1a-1c). The layers disclosed in Ocampo generally include a main iris layer, an inner starburst layer, and an outer starburst layer. In combination, the three (or more) layers create a natural appearance to an observer—as long as the observer with 20/20 vision is standing at a distance of at least 3 feet from the wearer. As shown in FIG. 2, such patterns are sometimes diffuse enough to allow the underlying iris to show through (as represented by the human iris schematic depicted therein). However, when such lenses are packaged or are observed up close, the regularity and large size of the print area causes the pattern to look unnatural to the observer.

Figure 5:
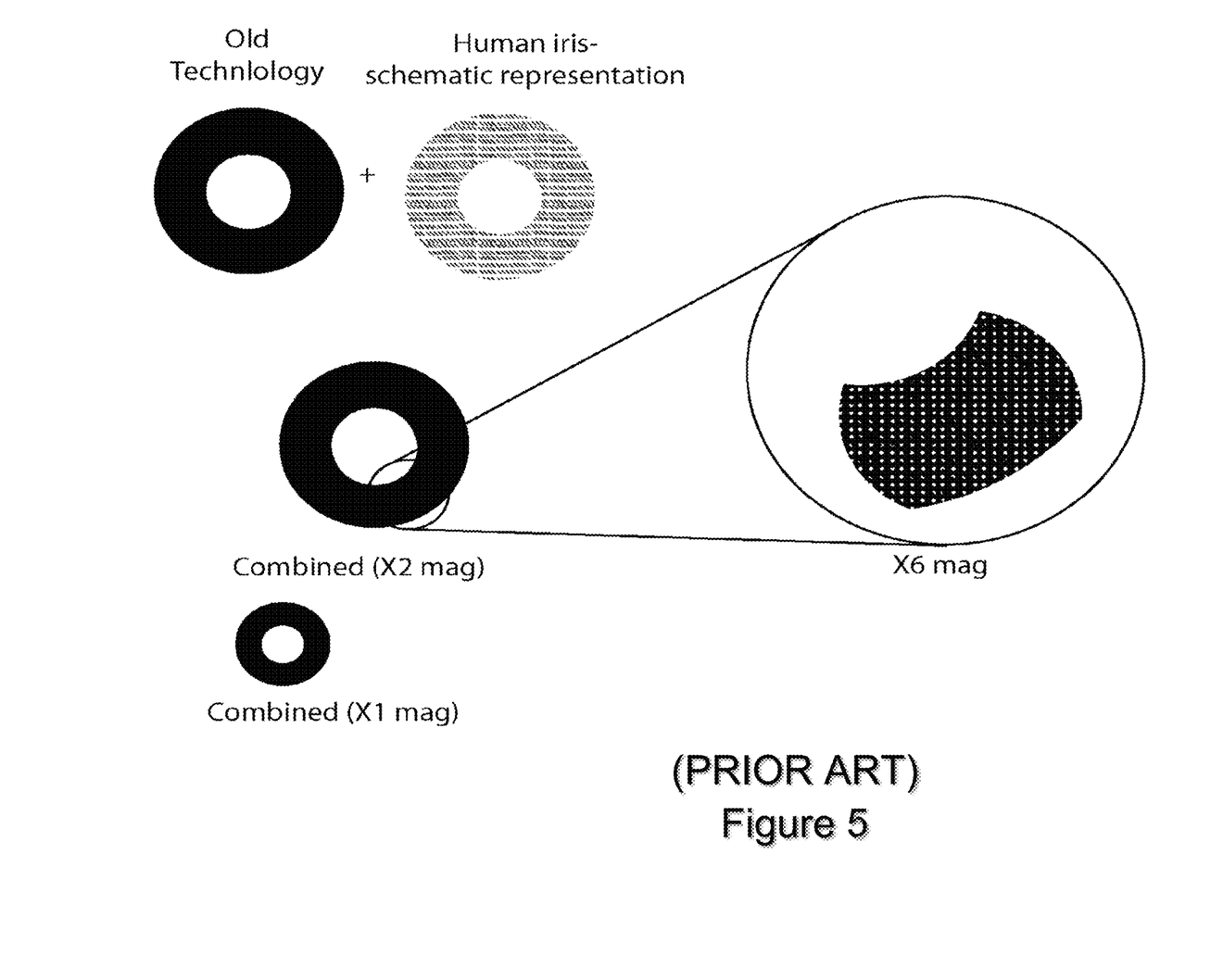
FIG. 5 depicts a known colored contact lens pattern having 80% of the iris printed combined with a schematic representation of a human iris and an enlarged view of the same.

Other examples of contact lens images are seen throughout the prior art, such as the contact lenses disclosed in Streibig U.S. Pat. No. 7,296,891. FIG. 5 shows that when such patterns are placed onto a wearer's iris, the pattern effectively blocks out the underlying iris, at long and short distances. Thus, without any blending of the contact lens image with the natural iris, the lens looks like a decal applied to the eye and appears very unnatural.

Therefore, it can be seen that needs still exist in the art for colored contact lenses and lens patterns that provide for a natural and realistic look, even at very short distances. It is to the provision of a colored contact lens and lens pattern that meet these needs and others that the present invention is primarily directed.

SUMMARY OF THE INVENTION

In example embodiments, the present invention provides for colored contact lenses having an extremely natural appearance because an amorphous image pattern—one that does not necessarily include any repetitive areas—is imprinted onto at least a portion of an iris section of the contact lens. The lens pattern is imprinted onto the lens leaving at least 20% of the iris unprinted, and more preferably at least 40%, such that the lens image blends with the underlying wearer's iris. Generally, such contact lenses have an aesthetically pleasing and natural appearance to observers who observe the contact lenses from any distance because the amorphous image patterns disclosed herein consist of domains having irregular shapes and varying values of colors. Such lens patterns allow for natural appearing, realistic, colored contact lenses even when observed from less than 16 inches from the wearer. Known colored contact lenses often look unrealistic when observed from distances less than one meter.

In one aspect, the present invention relates to a method of making an amorphous pattern of an iris for use with a colored contact lens. The method generally includes the steps (1) opening an image file in a photo editing software application, the image file containing a base image having at least two colors, (2) distorting the base image with one or more filters to create a distorted image, (3) reducing the opacity of the distorted image to create a translucent image, (4) modifying the size of the translucent image to create a sized image, and (5) using a cut-out filter to create a lens shape from the sized image, the lens shape being defined by a substantially circular outer diameter having a smaller substantially inner circle removed therefrom.

In another aspect, the invention relates to a method of manufacturing a colored contact lens. The method includes the steps of providing a transparent contact lens having a pupil section and an iris section, the iris section surrounding the pupil section and applying a colorant to the surface of the contact lens. The colorant is applied to the contact lens as an amorphous pattern and covers an effective amount of the iris section of the same. The amorphous pattern provides a lens capable of changing the apparent color of the iris of a person wearing the lens while imparting a very natural appearance.

In still another aspect, the invention relates to a colored contact lens including a non-opaque pupil section, an iris section that surrounds the pupil section, and a colored amorphous pattern imprinted onto at least a portion of the iris section. Optionally, the amorphous pattern is imprinted onto the contact lens with transparent and/or semi-transparent ink. Still optionally, the amorphous pattern is imprinted onto the contact lens with opaque ink.

These and other aspects, features and advantages of the invention will be understood with reference to the drawing figures and detailed description herein, and will be realized by means of the various elements and combinations particularly pointed out in the appended claims. It is to be understood that both the foregoing general description and the following brief description of the drawings and detailed description of the invention are exemplary and explanatory of preferred embodiments of the invention, and are not restrictive of the invention, as claimed.

DETAILED DESCRIPTION OF EXAMPLE EMBODIMENTS

The present invention may be understood more readily by reference to the following detailed description of the invention taken in connection with the accompanying drawing figures, which form a part of this disclosure. It is to be understood that this invention is not limited to the specific devices, methods, conditions or parameters described and/or shown herein, and that the terminology used herein is for the purpose of describing particular embodiments by way of example only and is not intended to be limiting of the claimed invention. Any and all patents and other publications identified in this specification are incorporated by reference as though fully set forth herein.

Also, as used in the specification including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

The term "amorphous image," as used herein, shall mean a continuous-tone image without a discernable repeating pattern as viewed by an ordinary viewer having 20/20 vision without the use of aids. This image is preferred to be multichromatic, but may be monochromatic. Typically, an amorphous image printed on a contact lens, by itself, would not look natural on a wearer's eye.

The term "transfigured amorphous image," as used herein, shall mean an amorphous image that is converted to a series of binary images through the novel image conversion process defined herein, and the amorphous image is transformed into printable artwork that is compatible with colored contact lens printing technology.

The term "discrete image" as used herein shall mean an image with a recognizable repeating pattern.

The term "ordinary viewer" as used herein shall mean a person having 20-20 vision and who is unaided by magnification or other viewing aides.

The term "binary image" as used herein shall mean an image having two potential values. Typically, for conventional printing, these are black and white. For this application, the binary image can be defined as regions where the color of interest is applied (i.e. green) and where the color is not applied. In many computer software systems, these are images stored in a "bitmap" format.

The term "grayscale image" is typically known as an image which the value of each pixel contains only intensity information. In the print media industry, each pixel is traditionally represented by a continuous level ranging from white (no print) to black (all print). Instead of a continuous range, a grayscale images can have multiple discrete levels of gray between the white and black. However, in example embodiments of the present invention, the term "grayscale" as used herein shall mean a range of color intensity values between no pixels and solid colored pixels of any color, and all intensity values in-between.

Figure 3:
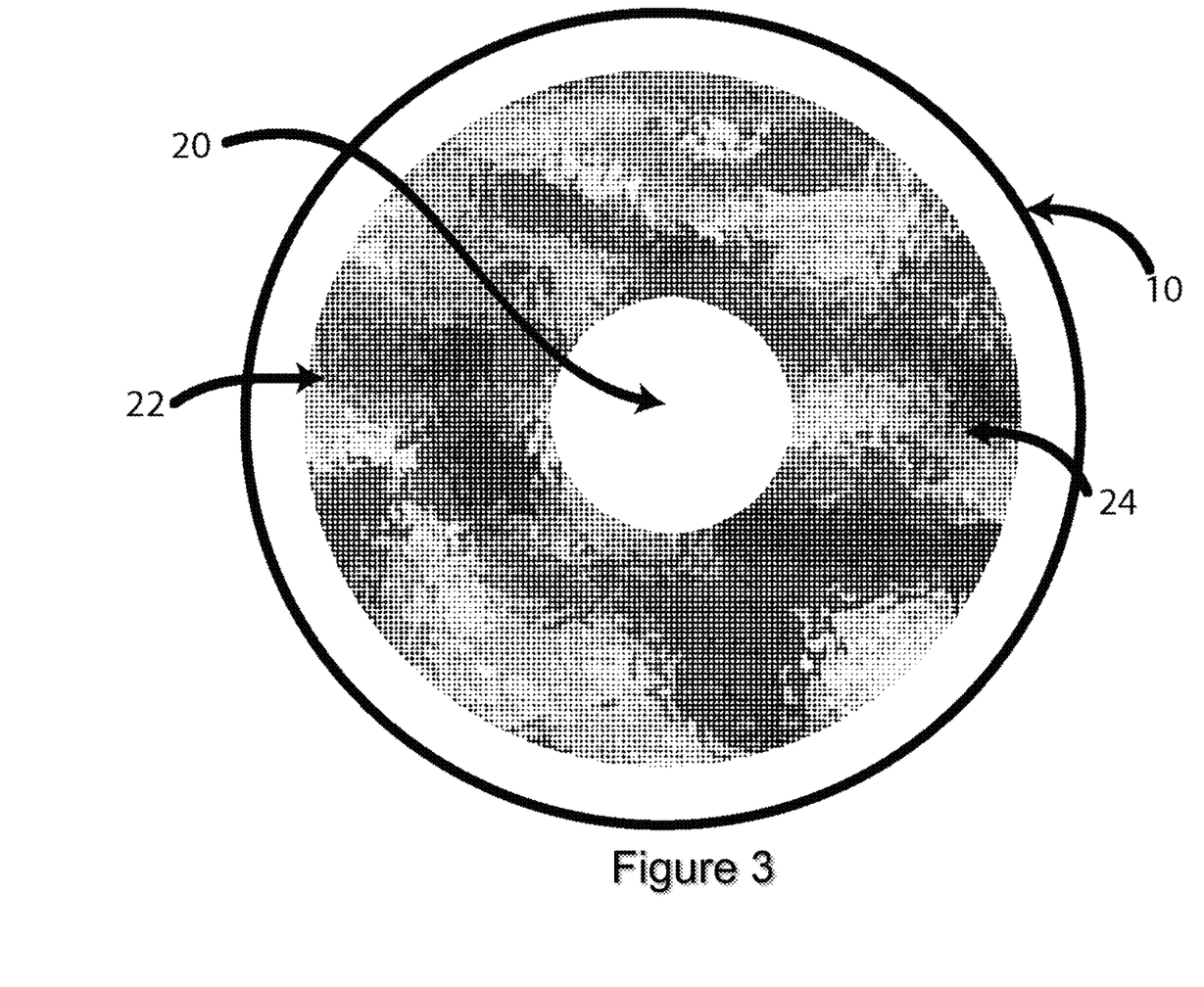
FIG. 3 is a colored contact lens having an amorphous pattern according to an example embodiment of the present invention.

With reference now to the drawing figures, wherein like reference numbers represent corresponding parts throughout the several views, FIG. 3 depicts a contact lens 10 according to an example embodiment of the present invention. The contact lens 10 generally includes a non-opaque pupil section 20 in the center of the lens along with an annular iris section 22 surrounding the non-opaque pupil section. As shown in FIG. 3, a colored amorphous pattern is located within a portion of the iris section 22 of the contact lens 10. In alternative embodiments, the colored amorphous pattern can cover between 5% and 100% of the iris section.

In example embodiments, the colored amorphous pattern 24 can be made up of elements such as dots having regular or irregular, uniform or non-uniform shapes, including but not limited to, round, square, hexagonal, triangular, elongated, or other dot shapes. In alternative example embodiments, the colored amorphous pattern 24 can be comprised of elements other than dots, such as worm-like lines, corkscrews, starbursts, spokes, spikes, striations, radial stripes, zig-zags, and or streaks.

In another preferred example embodiments, the amorphous image pattern 24 is comprised of unprinted element size having individual areas of greater than about 1200 $\mu m^2$ (approximately 40 $\mu m$ dot diameter) and more preferably greater than about 3000 $\mu m^2$ (approximately 60 $\mu m$ dot diameter). Optionally, the amorphous image pattern 24 can be comprised of overlapping dots as desired.

The present invention provides for colored contact lenses having an extremely natural appearance because the amorphous image pattern 24 does not include any large discrete or repetitive areas, which generally are easily discerned by the human eye. Known discrete patterns, such as those shown in FIGS. 1a-1c and FIG. 2, generally have an aesthetically pleasing and natural appearance to observers who observe the contact lenses from distances greater than three feet, especially since at such distances the dots blend together to form a realistic looking natural iris pattern. However, at distances of less than three feet, an observer is likely to discern that the images printed, as shown in FIGS. 1a-1c and FIG. 2, are unnatural and/or unrealistic, because of the grid-like regularity of the dot placement and unnatural blending of the underlying iris with the lens pattern.

Conversely, the amorphous image patterns disclosed herein consist of domains having large irregular shapes and varying values of colors—similar to how camouflaged patterns are used to break up repetitive images of an underlying object. Such lens patterns allow for natural appearing, realistic, colored contact lenses even when observed from very short distances. In fact, it has been discovered that the use of amorphous image patterns can render colored contact lenses natural and realistic appearing when an observer is less than 16 inches from the wearer.

Amorphous images can be obtained from nature, mathematics, or such images can be created by artists. Unfortunately, by themselves, these images cannot be printed onto contact lenses using conventional printing techniques. Rather, to be used with current contact lens printing techniques, it has been found that amorphous images must be converted into binary images.

It has been determined that any image, if printed at high coverage, looks unnatural to an ordinary viewer because the image does not blend well with the wearer's natural eye. For example, FIG. 5 depicts a known colored contact lens pattern, wherein 80% or more of the underlying iris is covered by the pattern, which does not allow the underlying iris to blend well with the lens. Instead, for a more natural appearance, the contact lens image must have some interstitial spaces between adjacent dots to allow blending of the lens' image with the wearer's iris. Therefore, any amorphous image design must be adjusted to properly control dot density.

Figure 4:
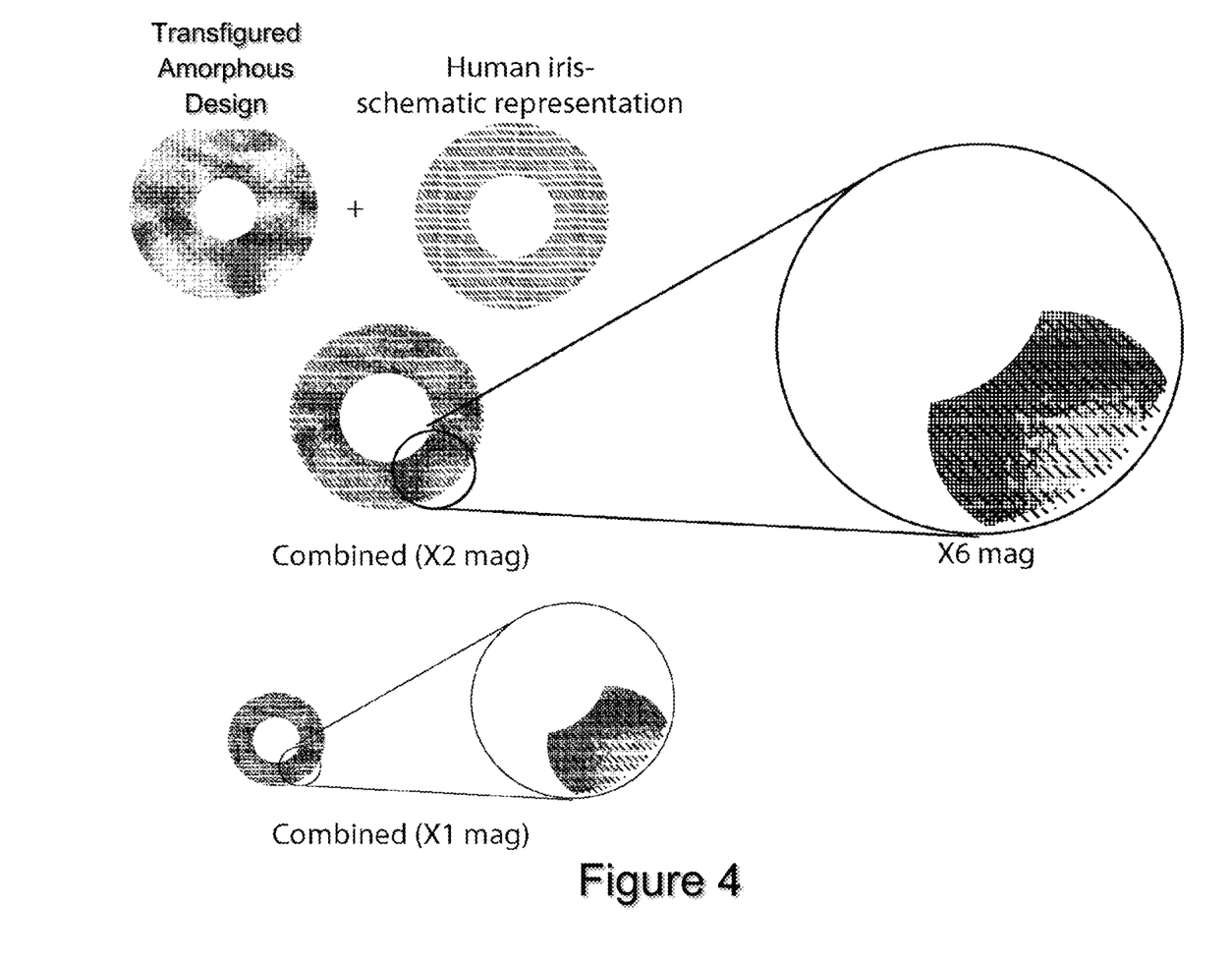
FIG. 4 depicts an amorphous image pattern according to an example embodiment of the present invention combined with a schematic representation of a human iris and an enlarged view of the same.

One aspect of the present invention is therefore a process to modify amorphous images to ready the images for printing on contact lenses. By using this process, a colored contact lens produced as a result is able to allow a wearer to retain much of their natural eye appearance because the lens blends well with the underlying iris structure of the wearer's natural eye. For instance, FIG. 4 depicts the excellent blending properties of the present invention by allowing the wearer's underlying iris to be seen through the lens' pattern. This is accomplished by carefully controlling of the process to convert continuous-tone amorphous images into multiple binary layers, which can then be printed onto a lens using conventional technique (i.e. pad printing, ink jet, dye sublimation, toner). The conversion process described herein must be carefully controlled to make sure dot density is high enough to simulate a continuous-tone image, but low enough to allow the underling "background" iris of the wearer to show through.

In another aspect, the present invention is a method of making a transfigured amorphous image that is suitable for use with a colored contact lens. An example method of making a transfigured amorphous image includes the steps of first opening any amorphous image (color or grayscale) in a photo editing software application (e.g. Adobe Photoshop®)) or first digitalizing or scan of an amorphous image into computer. The image can be a photograph, a rendering, an image created by an artist or a graphic designer, or any other image that suits the needs of the user. For instance, in one example embodiment, the amorphous image can be totally unrelated to any eye structure(s), such as a camouflaged patterns, cloud patterns. Alternately, the image could be generated by digitalizing a photograph or scan of a natural eye (or just an iris), or the image can be generated by combining two or more photographs/scans of a natural eye into one image. Regardless of the source, once the image has been identified and opened in a photo editing software application, the user can optionally crop and resize the image as desired. In example embodiments, the lens shape is generally a circle having an outer diameter between about 12 mm and about 18 mm in diameter, and more preferably about 14 mm, and further having an inner circle removed therefrom having a diameter between about 4 mm and about 6 mm, and more preferably about 5 mm. Next, the user can use imaging techniques to adjust the image's sharpness and/or modify the image's brightness and contrast.

Subsequently, the image is converted into a single or multiple grayscale images, based upon the number of colors and layers desired for the final product. The opacity of these grayscale images (or portions of the image) are adjusted to obtain the desired amount of colorant for each image or portion of the lens.

Thereafter, the grayscale image(s) are then converted to binary images using such techniques as halftoning (either frequency or amplitude halftoning, error diffusion), dithering (i.e. Floyd-Stinberg, diffusion dithering), convolution of grayscale with different patterns, or other techniques known in the art.

Figure 6:
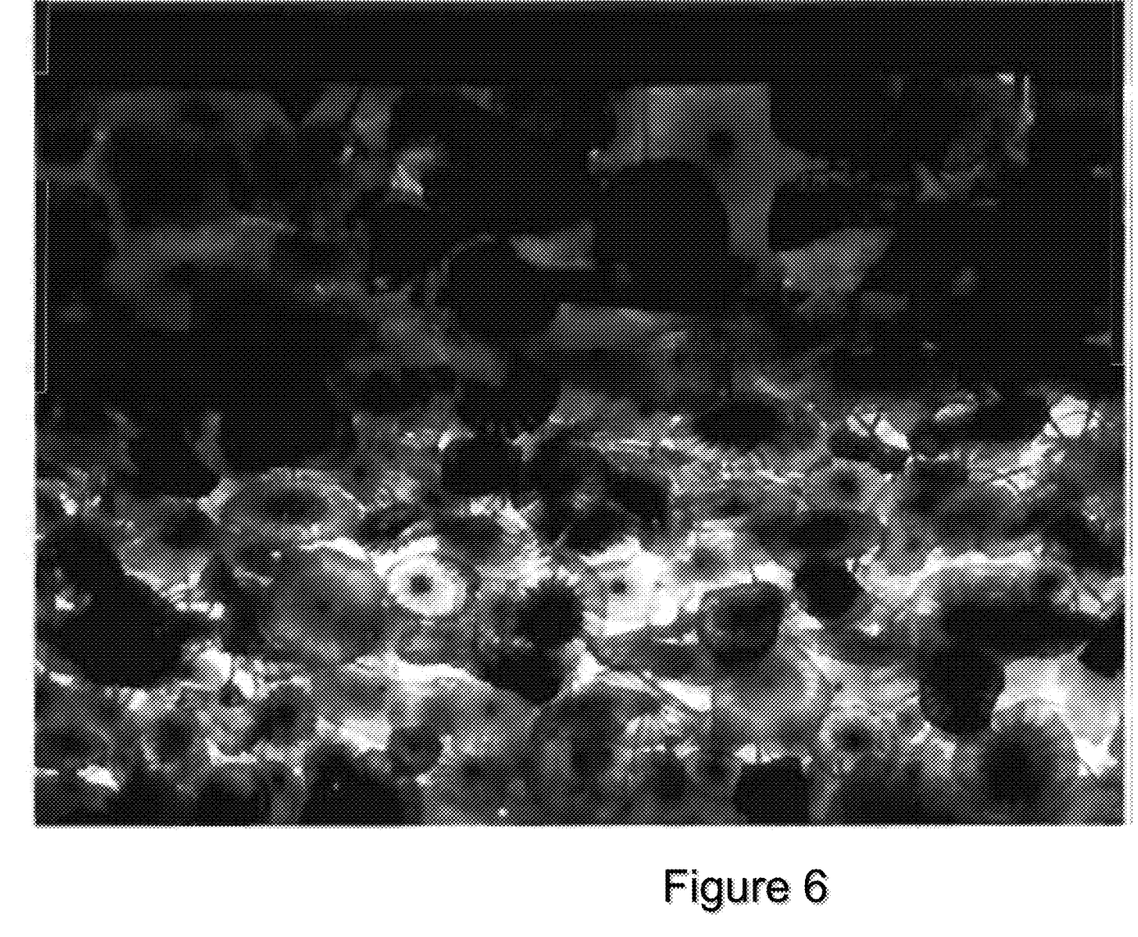
FIG. 6 is a base image for editing according to an example method of the present invention.
Figure 7:
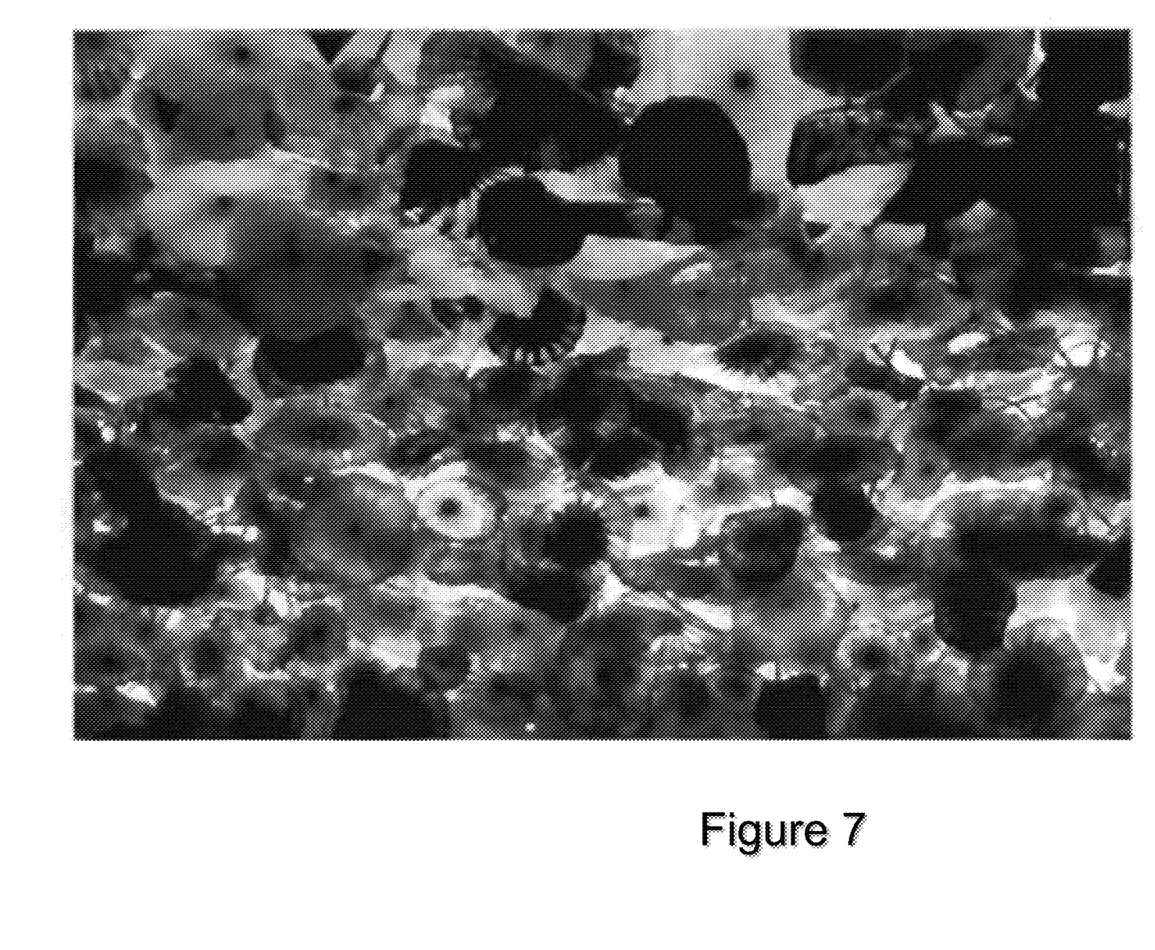
FIG. 7 is the image of FIG. 6, in an example stage of editing, shown cropped, and having the brightness and contrast selectively modified.
Figure 8:
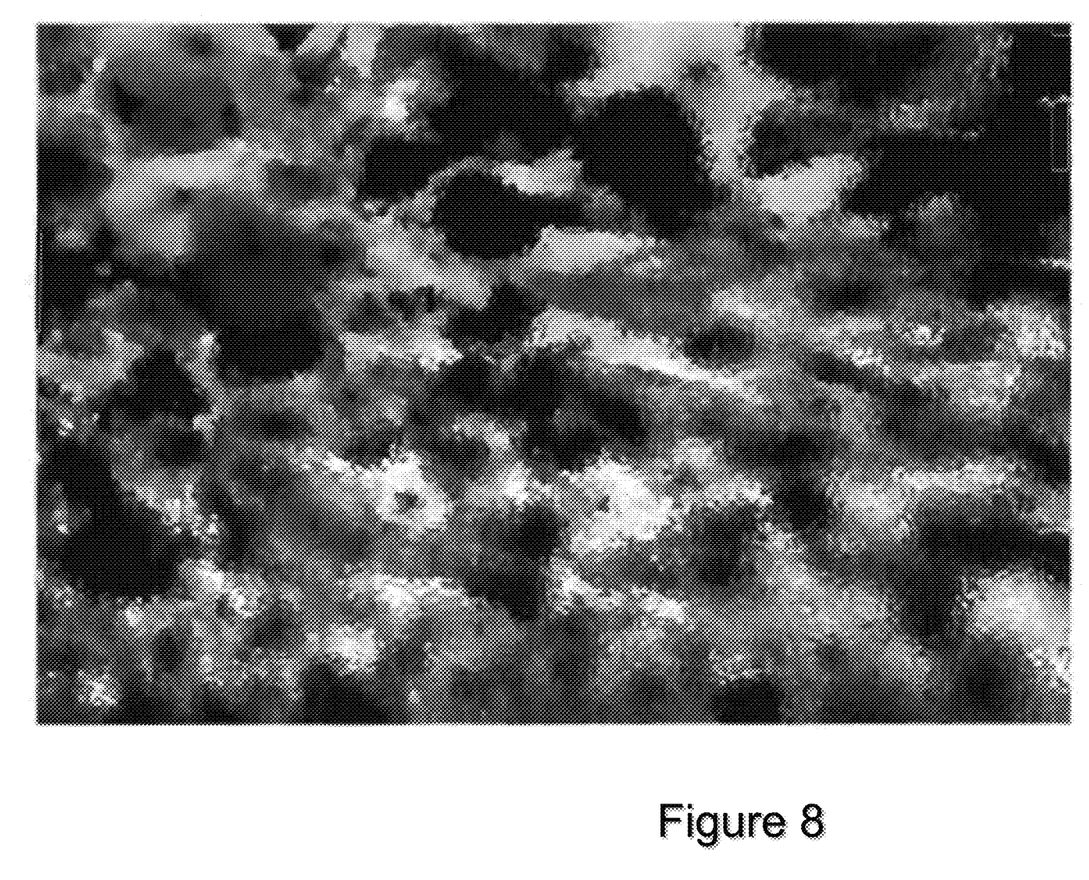
FIG. 8 is the image of FIG. 7, in another example stage of editing, shown distorted with an ocean ripple filter.
Figure 9:
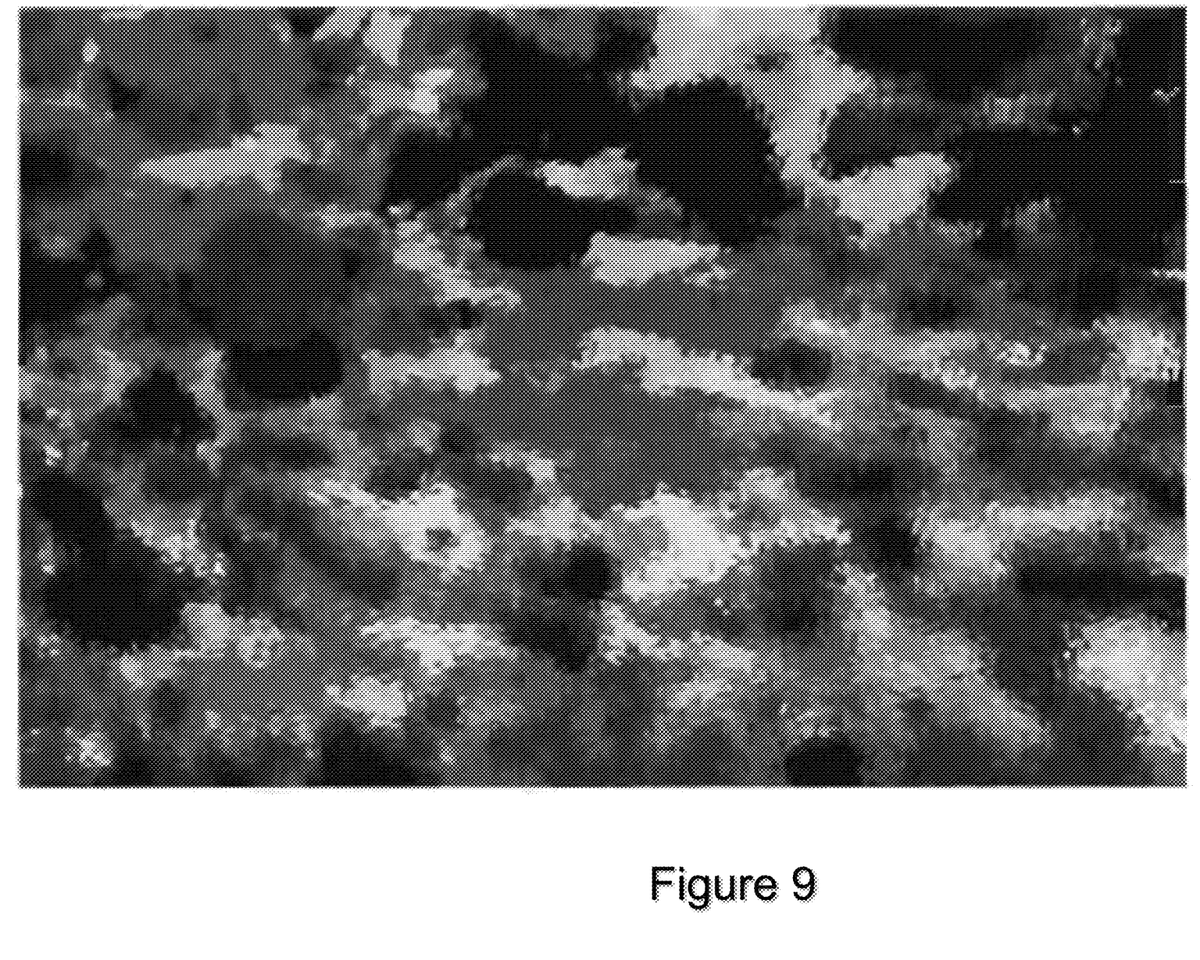
FIG. 9 is the image of FIG. 8, in another example stage of editing, after having a cut-out filter applied thereto.
Figure 10A:
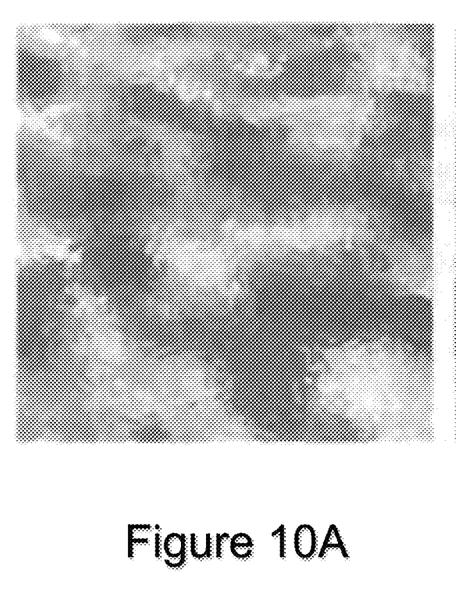
FIGS. 10*a*-10*c* show a cropped portion of FIG. 9, in another example stage of editing, converted to grayscale and having the opacity modified by 50%, 75% and 95%, respectively.
Figure 10B:
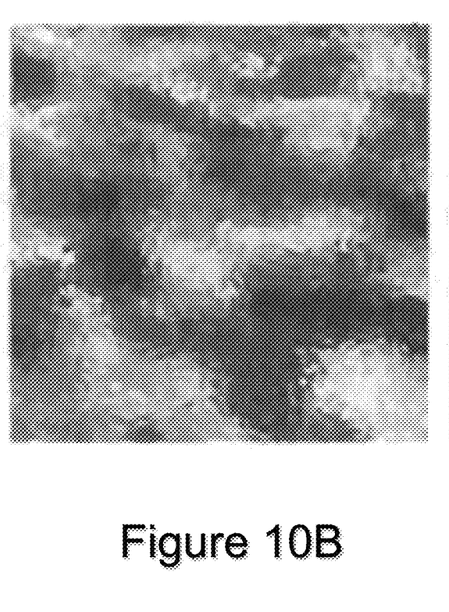
Figure 10C:
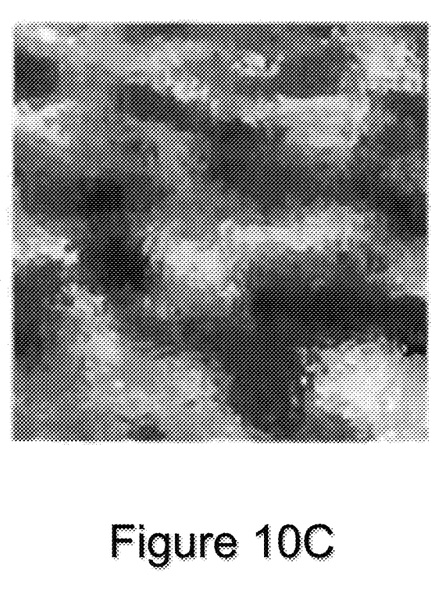
Figure 11A:
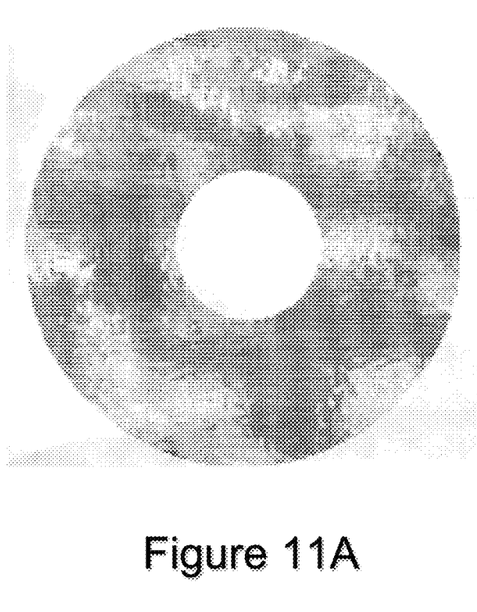
FIGS. 11*a*-11*c* show the images of FIGS. 10*a*-10*c*, in another example stage of editing, in binary format and formed into a lens shape to create amorphous lens patterns for use with colored contact lenses according an example embodiment of the present invention.
Figure 11B:
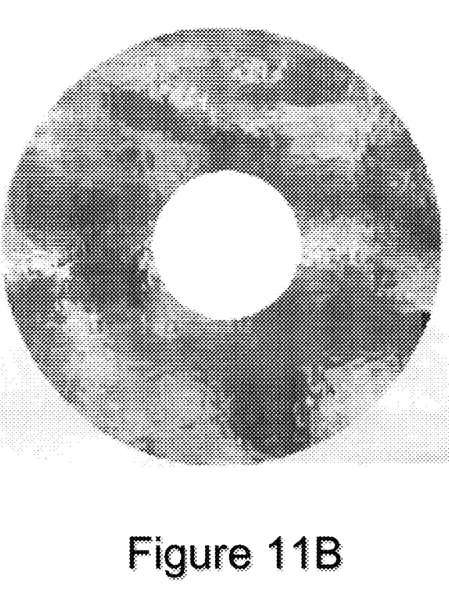
Figure 11C:
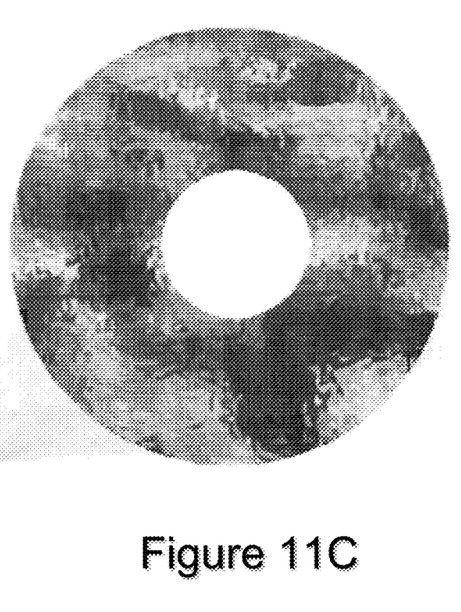

In a specific example embodiment the method of making an amorphous image for use with colored contact lenses is embodied in the following steps (note that this particular embodiment utilizes Adobe Photoshop®, however, other example embodiments utilize other photo editing software packages):

a. Open a stock amorphous image entitled "glass flowers" in Adobe Photoshop®, which is a 180 dpi image sized at 8.5 inches by 11 inches, as seen in FIG. 6;

b. Crop the image to show only the flowers; select the top part of the picture (using the Magnetic Selection Tool to select around shapes), feather the selection by 2 pixels to reduce the edge sharpness and modify brightness and contrast by +117 and +64, respectively, as shown in FIG. 7.

c. Apply the Ocean Ripple filter utilizing the following settings, as depicted in FIG. 8 to create a distorted image:
        i. Ripple Size=12;
        ii. Magnitude=10;

d. Apply the Cut Out filter with the following settings, as seen in FIG. 9:
        i. Number of Levels=5;
        ii. Edge Simplicity=4;
        iii. Edge Fidelity=2;

e. Convert the image to grayscale;

f. Create three different grayscale images:
        i. First image having the opacity modified to 50%;
        ii. Second image having the opacity modified to 75%;
        iii. Third image having the opacity modified to 95%;

g. Crop each image as desired (FIGS. 10*a*, 10*b*, and 10*c* depict the results of Steps e-g);

h. Modify each image size to 15 mm square (or substantially square) having a resolution of approximately 1600 dpi.

i. Convert the three different grayscale images to binary using the following settings:
        i. Output=1600 ppi (pixels per inch);
        ii. Halftone Screening
            1. Screen Frequency=230 lpi (lines per inch)
            2. Screen Angle=0°
            3. Screen Shape=Round     j. Cut out a lens shape from each grayscale image with a 15 mm outer circle and a 5 mm inner circle (FIGS. 11*a*, 11*b*, and 11*c* depict the results of Steps h-j).

Figure 12A:
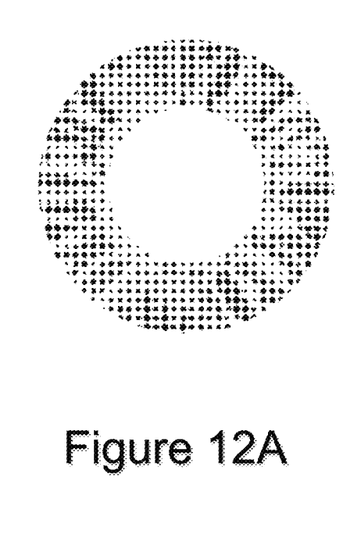
FIGS. 12*a*-12*c* show an amorphous image according to an example embodiment of the present invention, separated into three layers: a main iris layer, an inner iris layer, and an outer starburst layer, respectively.
Figure 12B:
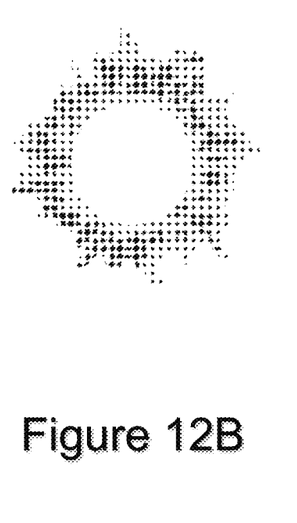
Figure 12C:
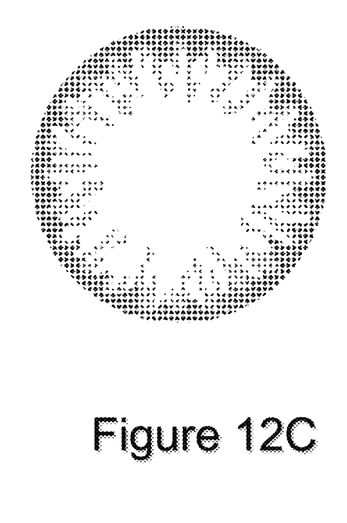

Once a transfigured amorphous image(s) has been created—either using a photo editing software or though other means—the image can be processed to optimize the natural appearance of the lens and to ready the image for printing. For example, in preferred example embodiments the transfigured amorphous image can be formed as three separate layers, as shown in FIGS. 12*a*-12*c*. FIG. 12*a* depicts a main iris layer 30 that can serve as a base layer for a colored contact lens. FIG. 12*b* depicts an inner iris layer 32 that can overlay the main iris layer 30 to help break up the main iris layer's inherent radial symmetry. Similarly, FIG. 12*c* depicts an outer starburst layer 34 can either be located beneath, or on top of, the main iris layer 30 and the inner iris layer 32 as desired. To add a three dimensional effect to the transfigured amorphous images, a radial gradient filter can optionally be applied to the same. Applying the optional radial gradient filter to the transfigured image helps impart the appearance of a structured iris when the image is printed on a contact lens having a curved outer surface.

In still other specific example embodiments, the halftone screening of the grayscale images is carefully controlled, and can vary by layer. It has been discovered that the following settings perform particularly well (see FIGS. 12A-12C).

TABLE 2

| Halftone Settings | | | |
|---|---|---|---|
|  | iris | outer | Inner |
| opacity (%) | 95 | 97 | 80 |
| linescreen (lines/inch) | 95 | 150 | 100 |
| Angle | 0° | 0° | 0° |
| shape | ellipse | round | Round |

The resulting binary images can be separately placed onto a contact lens using conventional printing techniques. The separate binary images can be overlayed or can remain separate. Multiple colors can be used to vary the color appearance of the lens using process color. In addition, the same color can be used in multiple binary images, to give more control of that particular color (i.e. different grayscale levels of that color).

In alternative embodiments, natural appearing lens patterns can originate from existing colored amorphous images, such as a photograph of a human iris or from an artist rendering. In such embodiments, the color information of the amorphous image can be broken into different color layers (e.g. cyan, yellow, magenta, and black). The different colored layers can be optimized to reduce any repeating patterns, based upon each color layer, and these layers can then be processed in a similar fashion to the grayscale images discussed above to form transfigured amorphous images. It has been found that one advantage of using colored amorphous images is that the overlaying of the different colored layers can more easily blend together for a realistic appearance.

In another aspect, the present invention is a colored contact lens that is imprinted with one or more transfigured amorphous patterns created by the methods generally described above. In one such example embodiment, the entire transfigured amorphous image, or images, can be directly applied to the contact lens by pad printing with semi-transparent and/or transparent inks. Utilizing semi-transparent and/or transparent ink to imprint the amorphous image(s) allows light to pass through the contact lens and reflect off of the wearer's natural iris, which would blend well with the light reflecting from the contact lens. In other example embodiments, the different levels of grayscale within the transfigured amorphous image(s) can be imparted to the contact lens by using different cliché depths in a single cliché. For example, darker areas of grayscale can be printed onto the lens using deeper voids in the cliché, while lighter areas can be printed onto the lens using shallower voids in the cliché. In still other example embodiments, one of ordinary skill in the art will understand that the depth of etching can be controlled via various means including, varying the laser etching settings (or laser-etched cliché), multiple masks (or acid-etched clichés), or otherwise. In alternative embodiments, multiple clichés of uniform depth utilizing colored inks can build the grayscale images as desired.

Alternatively, the ink can be printed on a semitransparent contact lens base. For example, the base lens may be formed as a one or two-color translucent base. In one such embodiment, the iris portion of the base lens can be colored with a translucent tint. In another embodiment, the pupil section of the lens may be colored by a non-opaque tint, which is not visible when the lens is against the dark pupil of a wearer's eye.

In still other example embodiments, the amorphous image(s) can be printed onto a contact lens using opaque inks.

However, when using opaque ink, rather than transparent or semi-transparent ink, it is typically advantageous (but not required) to allow a certain amount of unprinted area to facilitate better blending of the amorphous pattern with the underlying iris. Generally, it is recommended to leave between about 5% and about 90% of the contact lens unprinted when using opaque inks (which is deemed to be an effective amount). In example embodiments, it is preferred that less than 80% of the area of the contact lens intended to cover the iris is printed, and more preferably less than about 60%, and even more preferably about 45% of the same area is printed. In order to prepare the amorphous image to leave unprinted areas on the contact lens, the amorphous images as described above can optionally be converted to binary image using the halftone screen setting in Adobe Photoshop® (or similar feature in alternative image processing software application). In still other example embodiments, a gradient can optionally be applied to the grayscale images to further enhance the contact lens visual appeal. These post-processing techniques, such as the half toning techniques discussed above, can be optimized to reduce or eliminate pattern discernment at close distances and simultaneously permit the contact lens to blend with the underlying iris.

In a further aspect, the present invention provides a transfer-printing method for making a colored hydrogel contact lens, comprising the steps of:

(a) inking, with a color ink, at least one cliché having a transfigured amorphous patterns to be printed on a contact lens to form an inked image in the cliché;

(b) transferring the inked image from the cliché to at least one surface of at least one contact lens forming mold by means of at least one transfer pad, (c) at least partially curing the inked image transferred on the mold surface to form a colored film;

(d) dispensing a hydrogel lens-forming material into at least one lens-forming cavity of the mold; and (e) curing the lens-forming material within the lens-forming cavity to form the contact lens, whereby the colored film detaches from the molding surface and becomes integral with the body of the contact lens.

The pad transfer printing method for making colored contact lenses is disclosed in U.S. Pat. Nos. 5,160,463; 5,302,978; 6,811,259; 7,354,959; 7,255,438, which are hereby incorporated by reference.

While the invention has been described with reference to preferred and example embodiments, it will be understood by those skilled in the art that a variety of modifications, additions and deletions are within the scope of the invention, as defined by the following claims.

What is claimed is:

1. A method of manufacturing a colored contact lens comprising the steps of:
    a) inking, with a color ink, at least one cliché having a transfigured amorphous simulated iris pattern to be printed on a contact lens to form an inked image in the at least one cliché;
    b) transferring the inked image from the at least one cliché to at least one surface of at least one contact lens forming mold by means of at least one transfer pad,
    (c) at least partially curing the inked image transferred on the at least one surface of at least one contact lens forming mold to form a colored film;
    (d) dispensing a hydrogel lens-forming material into at least one lens-forming cavity of the at least one contact lens forming mold; and
    (e) curing the hydrogel lens-forming material within the at least one lens-forming cavity to form the contact lens, whereby the colored film detaches from the at least one surface of at least one contact lens forming mold and becomes integral with a body of the contact lens,
    wherein the transfigured amorphous simulated iris pattern is made by the method comprising the steps of:
    opening or scanning an image file in a photo editing software application, said image file containing a base amorphous image having at least two colors, wherein the base amorphous image is totally unrelated to any eye structure;
    distorting the base amorphous image with one or more filters to change a shape of contents of the base amorphous base image,
    reducing the opacity of the distorted base amorphous image to create a translucent image;
    modifying the size of the translucent image to create a sized image; and
    cutting out a lens shape from the sized image to simulate iris shape, the lens shape being defined by a substantially circular outer diameter having a smaller substantially inner circle removed therefrom.

2. The method of claim 1, further comprising the step of selectively modifying the base amorphous image's sharpness, contrast, brightness or combinations thereof.

3. The method of claim 1, further comprising the step of converting the distorted base amorphous image into grayscale.

4. The method of claim 1, further comprising the step of converting the distorted base amorphous image into at least three grayscale image files.

* * * * *